United States Patent [19]

Yamanami et al.

[11] Patent Number: 5,444,190

[45] Date of Patent: Aug. 22, 1995

[54] SENSING UNIT FOR A POSITION DETECTING APPARATUS AND ITS MANUFACTURING METHOD

[75] Inventors: Tsuguya Yamanami; Toshihide Chikami, both of Saitama, Japan

[73] Assignee: Kabushikikaisha Wacom, Saitama, Japan

[21] Appl. No.: 899,782

[22] Filed: Jun. 17, 1992

[30] Foreign Application Priority Data

Dec. 5, 1991 [JP] Japan .................................. 3-321784

[51] Int. Cl.⁶ .............................................. G08C 21/00
[52] U.S. Cl. ...................................................... 178/18
[58] Field of Search ............................... 178/18, 19, 20

[56] References Cited

U.S. PATENT DOCUMENTS

| | | | |
|---|---|---|---|
| 4,678,870 | 7/1987 | Taguchi et al. | 178/19 |
| 5,117,071 | 5/1992 | Greanias et al. | 178/19 |
| 5,136,125 | 8/1992 | Russell | 178/19 |
| 5,218,173 | 6/1993 | Garwin et al. | 178/18 |

*Primary Examiner*—Stephen Chin
*Assistant Examiner*—Kevin Kim
*Attorney, Agent, or Firm*—Lowe, Price, LeBlanc & Becker

[57] ABSTRACT

The present invention provides a sensing unit for a position detecting apparatus permitting freer setting of a reading efficiency and having a thinner appearance and its manufacturing method for realizing simple manufacturing, high yield, and low cost.

According to the present invention, two plies of conductor patterns 22 and 23 are produced on one side 21a of an insulating substrate 21 to form a plurality of sense wires, a shielding plate 28 is adhered to other side of the insulating substrate 21, then the insulating substrate 21 is died together with the shielding plate 28. This obviates through holes for which drilling the insulating substrate is required, and diminishes the difference between the distances of the two plies of conductor patterns 22 and 23 from a position indicator. Furthermore, a spacer for separating conductor patterns from a shield becomes unnecessary.

9 Claims, 4 Drawing Sheets

SENSING UNIT FOR A POSITION DETECTING APPARATUS AND ITS MANUFACTURING METHOD

BACKGROUND OF THE INVENTION

1. Field of the Invention

The present invention relates to a sensing unit for a position detecting apparatus using electromagnetic actions, and its manufacturing method.

2. Description of the Related Art

A position detecting apparatus for detecting positions designated with a position indicator has been introduced in the past, wherein position detection is based on electromagnetic actions working between a sensing unit having a plurality of sense wires and a position indicator having at least a coil or a magnetic substance.

FIG. 2 is a top view of an exemplary sensing unit for the foregoing conventional position detecting apparatus, or in this example, an apparatus for detecting x- and y-coordinate values of a position designated with a position indictor. In FIG. 2, 1-1 to 1-8 denote x-axis sense wires. 2-1 to 2-8 denote y-axis sense wires. 3 is an insulating substrate.

The x-axis sense wires 1-1 to 1-8 are one-turn loop coils and set in array to overlap one after another in the x-axis direction. The y-axis sense wires 2-1 to 2-8 are one-turn loop coils and set in array to overlap one another in the y-axis direction. The sense wires 1-1 to 1-8 and 2-1 to 2-8 are connected to electronic components (not shown) mounted on the insulating substrate 3 via lines 4-1 to 4-8 and 5-1 to 5-8 for sending or fetching signals to or from the sense wires. The sense wires 1-1 to 1-8 and 2-1 to 2-8, and the lines 4-1 to 4-8 and 5-1 to 5-8 are formed by combining two plies of conductor patterns produced on both sides of the insulating substrate 3 (the patterns are indicated with solid lines and dashed lines in FIG. 2).

The aforesaid sensing unit of prior art is provided with a shielding plate for preventing influence of external electromagnetic waves and reducing external leakage of an electromagnetic wave. The shielding plate is installed on one side of the sensing unit (on the side which is not used to designate positions with a position indicator).

FIG. 3 is a side sectional view of a conventional sensing unit having the foregoing shielding plate. In FIG. 3, 3 denotes an insulating substrate. 6 and 7 are conductor patterns. 8 and 9 are lands. 10 and 11 denote overcoat. 12 denotes a through hole. 13 is a shielding plate. 14 is a spacer. 15 and 16 denote double-sided adhesive tape.

Conductor patterns 6 and 7 form sense wires 1-1 to 1-8 and 2-1 to 2-8, and lines 4-1 to 4-8 and 5-1 to 5-8, which are produced by etching copper foils adhered on both sides of an insulating substrate 3 formed with a glass epoxy substrate. Parts of the conductor patterns 6 and 7 are bared to drill through holes for mounting an electronic component or allowing the conductor patterns 6 and 7 to conduct, thus forming lands 8 and 9. The insulating substrate 3 except the lands 8 and 9 and the conductor patterns 6 and 7 are coated with overcoat 10 and 11 made from epoxy resin or other insulating material by means of screen printing. After overcoat processing, a through hole 12 is produced through numerically-controlled drilling, and solder-plating (17).

A shielding plate 13 is made of silicon steel or stainless alloy, and adhered to one side of an insulating substrate 3, or in this example, a side covered with a conductor pattern 7 and overcoat 11 using double-sided adhesive tape 16 with double-sided adhesive tape 15 and a spacer 14 interposed. The spacer 14 is interposed to prevent the shielding plate 13 from approaching the conductor pattern 7 too closely and thus adversely affecting the electromagnetic action working between the conductor pattern 7 and a position indicator (not shown).

However, the aforesaid sensing unit has problems mentioned below. First, a through hole 12 must be drilled to allow conductor patterns 6 and 7 to conduct. However, as described previously, numerically-controlled drilling must be done to produce the through hole 12. As the through hole 12 grows in number, more time is required, yield deteriorates, and cost increases. Secondarily, double-sided adhesive tape is employed to mount a shielding plate 13, especially, a spacer on an insulating substrate 3, because when adhesive is directly applied, the adhesive may come out of the opposite side through the through hole 12. Then, the insulating substrate 3 having conductor patterns, shielding plate 13, and spacer 14 are molded to have the same dimensions in a well-known dicing process. After that, the spacer is mounted on the insulating substrate 3 by an experienced operator. This results in poor productivity and high cost. The third problem is that the conductor pattern 6 forming mainly x-axis sense wires 1-1 to 1-8 is separated from the conductor pattern 7 forming mainly y-axis sense wires 2-1 to 2-8 by the thickness of the insulating substrate 3 (normally, about 1 mm). This creates a difference equivalent to the thickness between the distance of the conductor pattern 6 from a position indicator and the distance of the conductor pattern 7 from the position indicator. The difference between the distances results in a difference between the electromagnetic actions in the x-axis and y-axis directions. This deteriorates reading efficiency for assuring position detecting precision. The fourth problem is that the spacer 14, which does not contribute to position detection at all, must be installed. Therefore, the sensing unit becomes thicker by the thickness of the spacer 14.

SUMMARY OF THE INVENTION

The object of the present invention is to solve the aforesaid problems of prior art or to provide a sensing unit for a position detecting apparatus permitting freer setting of a reading efficiency and having a thinner appearance and the manufacturing method for realizing simple manufacturing, high yield, and low cost.

To achieve the above object, the present invention proposes a sensing unit for a position detecting apparatus that includes a plurality of sense wires formed by combining at least two plies of conductor patterns. Herein, the at least two plies of conductor patterns are formed on one side of an insulating substrate and a shield is mounted on other side of the insulating substrate. Also proposed is a method of manufacturing a sensing unit for a position detecting apparatus that includes a plurality of sense wires, wherein at least two plies of conductor patterns are produced on one side of an insulating substrate to form a plurality of sense wires, then a shield is mounted on other surface of the insulating substrate, then the insulating substrate is died together with the shield.

According to a sensing unit for a position detecting apparatus in which the present invention is implemented, at least two piles of conductor patterns are formed on one surface of an insulating substrate. This obviates through holes for which drilling the insulating substrate is required, and diminishes the difference between distances from a position indicator. A shield is mounted on other side of the insulating substrate, thus obviating a spacer for keeping the shield apart. According to a method of manufacturing a sensing unit for a position detecting apparatus in which the present invention is implemented, a sensing unit can be manufactured to have no through holes, diminish a difference between distances from a position indicator, and obviate a spacer.

DESCRIPTION OF THE PREFERRED EMBODIMENTS

Figure 1:
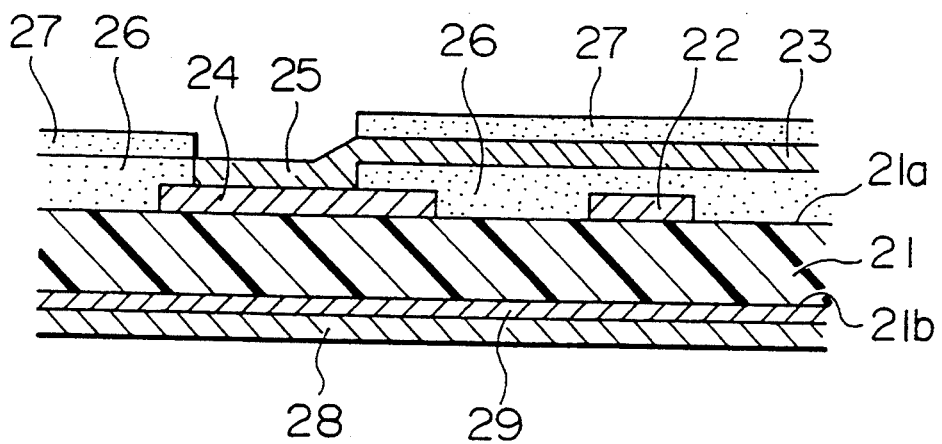
FIG. 1 is a cross-sectional diagram showing a main section of an embodiment of a sensing unit for a position detecting apparatus according to the present invention.

FIG. 1 is a cross sectional view of an embodiment of a sensing unit for a position detecting apparatus according to the present invention. In FIG. 1, 21 denotes an insulating substrate. 22 and 23 denote conductor patterns. 24 and 25 are lands. 26 denotes undercoat, and 27, overcoat. 28 is a shielding plate. 29 is adhesive.

Figure 4A:
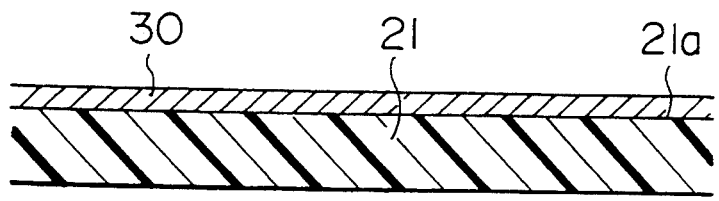
FIGS. 4a to 4e are illustrations of steps in a for manufacturing a sensing unit for a position detecting apparatus shown in FIG. 1.
Figure 4B:
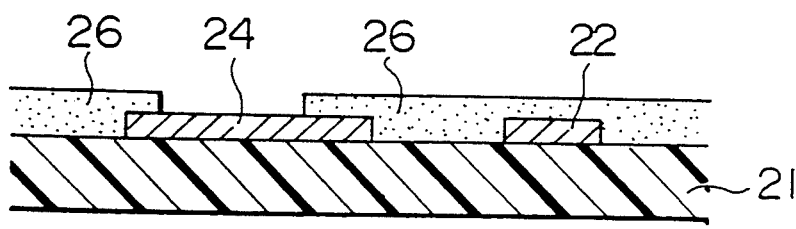

Conductor patterns 22 and 23 that are made of copper and mutually isolated with undercoat 26 made from epoxy resin or other insulating material are formed on one side 21a of an insulating substrate 21 formed with a glass epoxy substrate. As illustrated in FIGS. 1, 4(d) and 4(e), upper land 25 extends through undercoat 26 and includes a lower face that is electrically and mechanically connected to an upper face of lower land 24 by virtue of an abutting relation of these faces. Lands 24 and 25 are parts of the conductor patterns 22 and 23 are formed to conduct directly with each other. The conductor pattern 23 is coated with overcoat 27 made from epoxy resin or other insulating material. On other side 21b of the insulating material 21, a shielding plate 28 made of nickel chromium alloy is mounted with adhesive 29 interposed.

Figure 2:
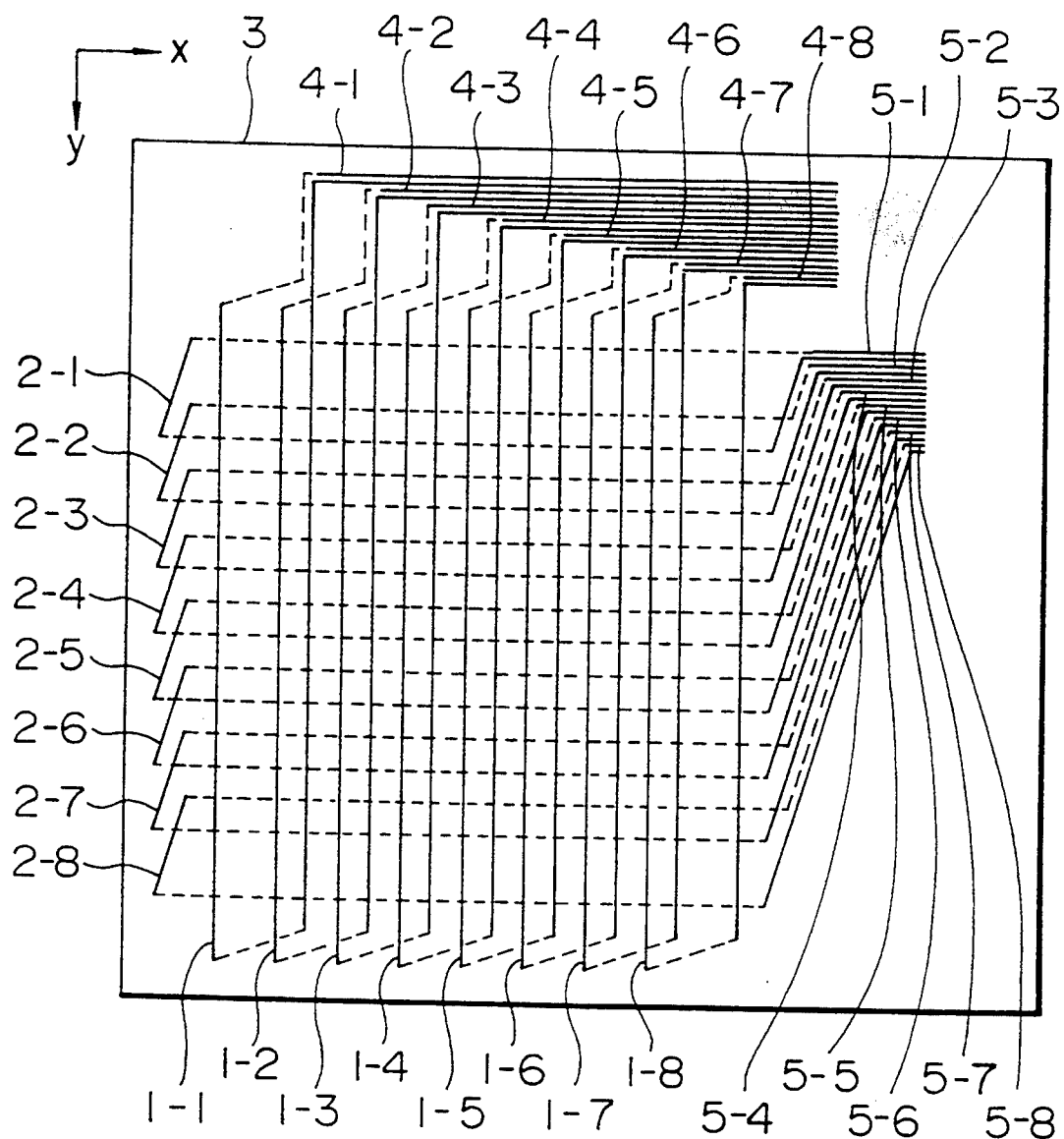
FIG. 2 is a configuration diagram showing an embodiment of a conventional sensing unit for a position detecting apparatus.
Figure 3:
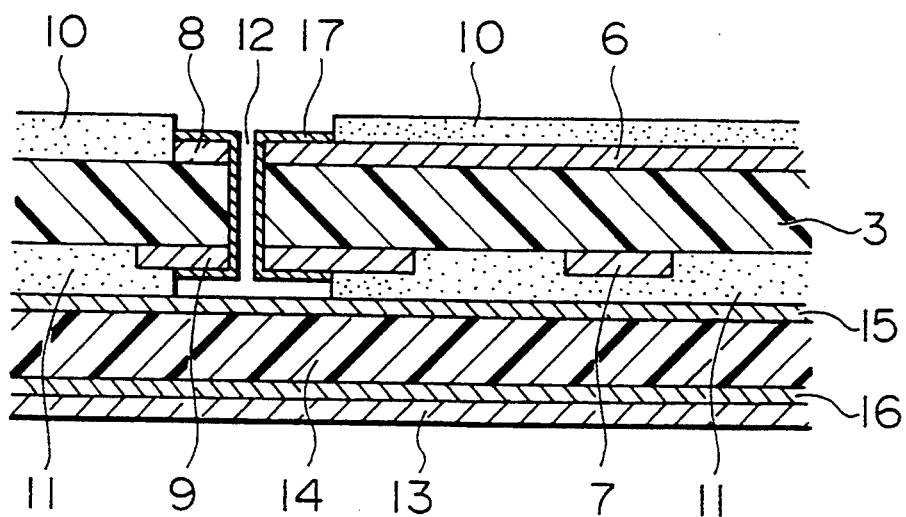
FIG. 3 is a cross-sectional diagram showing a main section of a conventional sensing unit for a position detecting apparatus having a shielding plate.

According to the foregoing configuration, no through holes are needed to connect the conductor patterns 22 and 23. Therefore, multiple holes need not be drilled by means of numerically-controlled drilling. This reduces the time required for manufacturing and increases yield. The absence of through holes prevents adhesive from oozing out the opposite side. Therefore, the shielding plate 28 can be mounted on the insulating substrate 21 without precise positioning prior to dicing. This improves productivity. The conductive pattern 22 forms mainly x-axis sense wires as described in the prior art example of FIG. 2, and the conductive pattern 23 forms mainly y-axis sense wires. The difference between the distances of the patterns 22 and 23 from a position indicator is equal to the thickness of the undercoat 26, or generally, ranges from 10 to 20 μm. The difference between electromagnetic actions in x-axis and y-axis directions becomes smaller than that in the example of prior art. This further improves reading efficiency for assuring position detecting precision. The conductor patterns 22 and 23 are formed on the side 21a of the insulating substrate 21, and the insulating substrate 21 itself serves as a member for separating the conductor patterns 22 and 23 from the shielding plate 28. This obviates the need for spacer 14 installed in the prior art example of FIG. 3. The entire sensing unit can be made thinner since spacer 14 is not used.

FIG. 4 is a series of drawings indicating manufacturing processes of a sensing unit shown in FIG. 1. The manufacturing method is described in conjunction with FIG. 4.

First, an insulating substrate 21 whose surface 21a is copper-foiled 30 in advance is prepared. Next, the copper-foil 30 is etched to produce a conductive pattern 22 and a land 24. Then, the conductive pattern 22 except the land 24 and the insulating substrate 21 are coated with epoxy resin or other insulating material by performing screen printing, thus forming undercoat 26 (FIG. 4b).

Figure 4C:
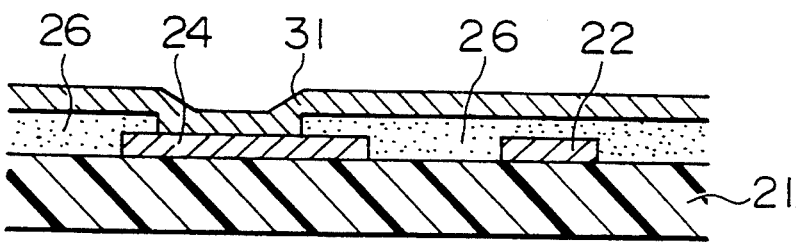
Figure 4D:
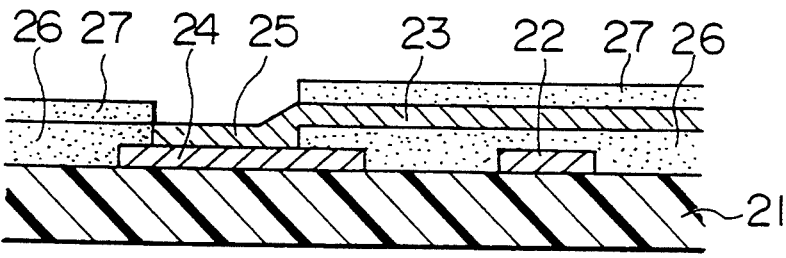
Figure 4E:
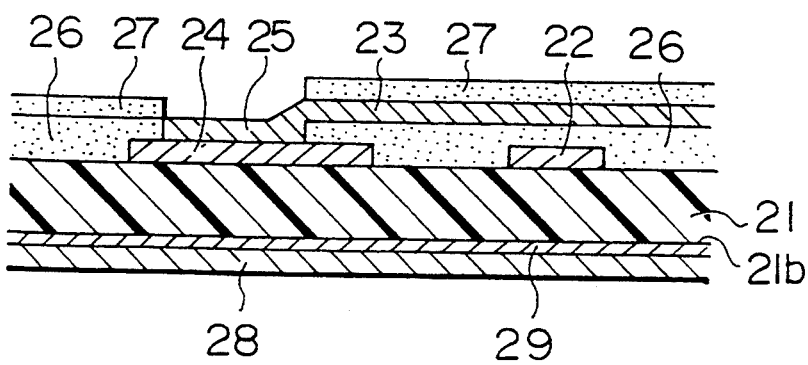

Next, the land 24 and undercoat 26 are copper-plated to form a uniform copper foil ply 31 as shown in FIG. 4c. Next, the copper foil ply 31 is etched in the same way as the copper foil 30 to produce a conductive pattern 23 and a land 25. Then, the conductive pattern 23 except the land 25 and the undercoat 26 are coated with epoxy resin or other insulating material by performing screen printing, thus forming overcoat 27 (FIG. 4d).

Furthermore, adhesive 29 is applied to other side 21b of the insulating substance 21. Then, a shielding plate 28 is adhered by pressing it on the adhesive 29 (FIG. 4e). Finally, the unit of the insulating substance 21 and shielding plate 28 is died to remove redundant, i.e., superfluous, peripheral portions. Holes necessary for attaching, the completed assembly to a package (not shown), for example, are bored to complete a sensing section.

Forming two plies of conductive patterns on one side of an insulating substrate has already been disclosed in Japanese Patent Laid-Open No. 62-199096.

One-turn loop coils that are set in array to overlap one another are used as sense wires configuring a sensing unit for a position detecting apparatus. However, the loop coils may not overlap one another. Besides, the present invention can apply to loop coils with two or more turns of wound wire Furthermore, linear conductors may be arranged in the form of a comb.

A shield is not limited to the aforesaid shielding plate 28 but may be well-known shielding film or plastic film laminated with metallic foils. Alternatively, a side of an insulating substrate may be plated with metal characteristic of shielding efficiency.

As described previously, according to a sensing unit of the present invention, at least two plies of conductor patterns can be electrically coupled without using through holes. Therefore, multiple holes need not be drilled. This reduces the time required for manufacturing, and improves yield. The absence of through holes eliminates a possibility that adhesive oozes out from the opposite side. Therefore, a shield can be mounted on an insulating substrate without precise positioning prior to dieing. This improves productivity, and eventually leads to drastic cost reduction. The difference between the distances of at least two plies of conductor patterns from a position indicator is smaller than that when the conductor patterns are formed on both sides of an insulating substrate as conventionally. Therefore, when the conductor patterns are used to form x- and y-axis sense wires, the difference between the electromagnetic actions is limited to improved reading efficiency for assuring position detecting precision. The insulating substrate itself serves as a member for separating the conductor patterns from the shield. This obviates a spacer that is included in certain of prior art devices. Consequently, the thickness of the entire sensing unit is reduced by the thickness of the spacer.

According to the manufacturing method of the present invention, simple manufacturing, high yield, and low cost are realized, and a sensing unit for a position detecting apparatus having greater reading efficiency and has a thinner appearance is provided.

What is claimed is:

1. A sensing unit for a position detecting apparatus having a plurality of sense wires formed of at least two layers of conductor patterns,
   said two layers of conductor patterns being successively laminated on one side of an insulating substrate such that a top one of the two layers is free of an opposed substrate, and a magnetic shield mounted on another side of said insulating substrate so as to reduce the influence of external electromagnetic waves and reduce external leakage of an electromagnetic wave coupled between the position detecting apparatus and the two layers of conductor patterns,
   the two layers of conductor patterns having respective upper and lower land patterns which abut each other for electrical connection, the upper land pattern extending through an electrical insulating layer and having a bottom face electrically and mechanically connected to an upper face of the lower land as a result of the abutting relation of the upper and lower lands.

2. A sensing tablet for the position of a position indicator responsive to waves including magnetic components comprising
   an insulating substrate having opposed first and second faces,
   a first plurality of spaced electrical conducting leads carried only by said substrate extending in a first coordinate direction, the first leads being on the same side as said first face,
   a second plurality of spaced electrical conducting leads carried only by said substrate extending in a second coordinate direction, the second leads being on the same side as said first face,
   an electrical insulating layer carried by said substrate on the same side as said first face, said layer being disposed between the first and second pluralities of spaced electrical conducting leads,
   a magnetic shield carried by the substrate on the same side as said second face, said shield being positioned and arranged so waves on the side of said second face having magnetic components are decoupled from the first and second leads and there is a reduction of external leakage of an electromagnetic wave coupled between the position indicator and the first and second plurality of leads,
   a lower electrically conducting land deposited as a coating on the substrate and electrically connected to the first leads, an upper electrically conducting land overlaying and abutting the lower land and electrically connected to the second leads and to the lower land, the upper land extending through the deposited coating and having a bottom face electrically and mechanically connected to an upper face of the lower land as a result of the abutting relation of the upper and lower lands.

3. The sensing tablet of claim 2 wherein:
   the first leads are deposited coatings on the first face, the insulating layer is a deposited coating on the first leads and the first face, and the second leads are deposited coatings on the insulating layer.

4. The sensing tablet of claim 3 further including an electrical insulating overcoat deposited as a coating on the second leads and the insulating layer.

5. The sensing tablet of claim 2 wherein the shield and the second face are bonded to each other by an adhesive.

6. A method of making a sensing tablet for the position of a position indicator responsive to waves including magnetic components comprising:
   forming a first plurality of spaced electrical conducting leads as coatings on a first face of a non-metallic substrate having a second opposed face, the first leads extending in a first coordinate direction,
   depositing a layer of electrical insulating material on the first face of the substrate and the first leads so exposed portions of the first face and the first leads are overlaid by the electrical insulating material,
   forming a second plurality of spaced electrical conducting leads as coatings on the deposited layer,
   applying a magnetic shield on the side of the substrate where the second face is located, the shield being applied at a position and arranged so waves on the side of said second face having magnetic components are decoupled from the first and second leads and there is a reduction of external leakage of an electromagnetic wave coupled between the position indicator and the first and second plurality of leads, the shield being applied by applying adhesive to one of the shield and the second face and then contacting the shield, the adhesive and the second face, removing superfluous peripheral portions of the insulating substrate and shield, and
   forming a first electrically conductive land on the first face as the first electrically conducting leads are formed and forming a second electrically conductive land so a lower face thereof abuts an upper face of the first land to be electrically and mechanically connected thereto, the second land being formed as the second leads are being formed.

7. The method of claim 6 further including applying an electrically insulating overcoat to the second leads and to the electrical insulating layer.

8. A method of making a sensing tablet for the position of a position indicator responsive to waves including magnetic components comprising:
   forming a first plurality of spaced electrical conducting leads as coatings on a first face of a non-metallic substrate having a second opposed face, the first leads extending in a first coordinate direction,
   depositing a layer of electrical insulating material on the first face of the substrate and the first leads so exposed portions of the first face and the first leads are overlaid by the electrical insulating material,
   forming a second plurality of spaced electrical conducting leads as coatings on the deposited layer,
   and applying a magnetic shield on the side of the substrate where the second face is located, the shield being applied at a position and arranged so waves on the side of said second face having magnetic components are decoupled from the first and second leads and there is a reduction of external leakage of an electromagnetic wave coupled between the position indicator and the first and second plurality of leads, forming a first electrically conductive land on the first face as the first electrically conducting leads are formed and forming a second electrically conductive land so a lower face thereof abuts an upper face of the first land to be electrically and mechanically connected thereto, the second land being formed as the second leads are being formed.

9. The method of claim 8 further including applying an electrically insulating overcoat to the second leads and to the electrical insulating layer.

* * * * *